Jan. 23, 1968  E. L. ACKLEY  3,364,819
HYDRAULIC GEAR MOTOR
Filed July 19, 1965  5 Sheets-Sheet 1
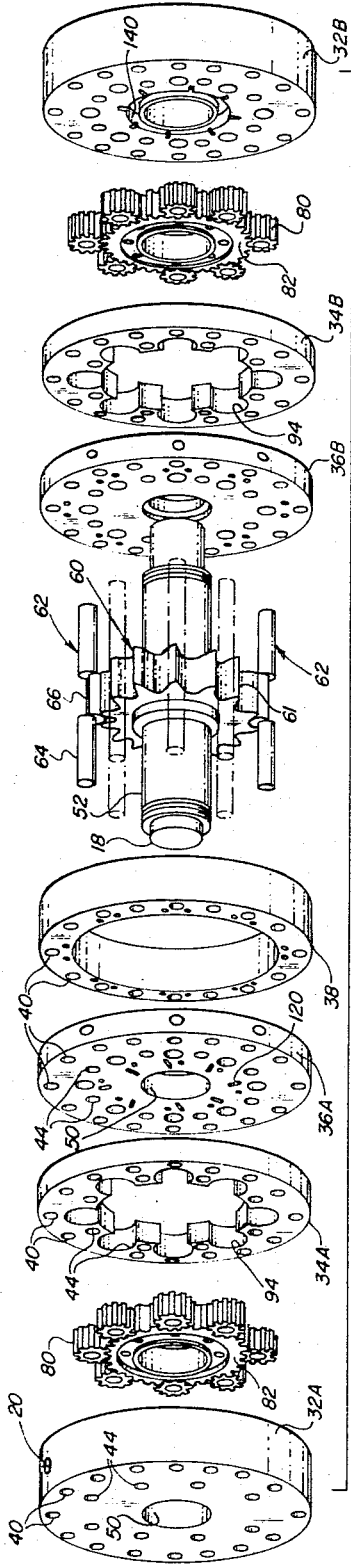
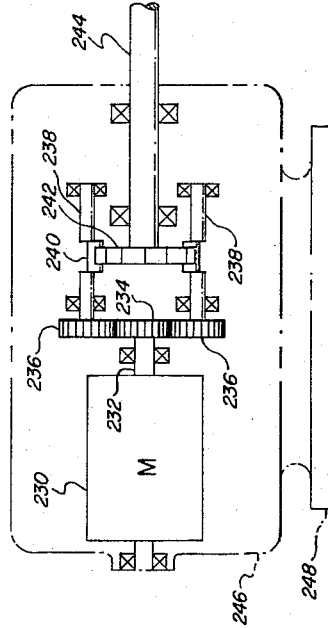
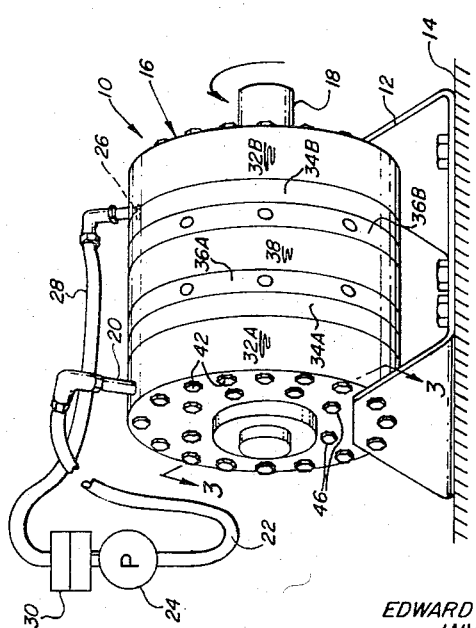
EDWARD L. ACKLEY
INVENTOR
BY
BUCKHORN, BLORE, KLARQUIST & SPARKMAN
ATTORNEYS Jan. 23, 1968  E. L. ACKLEY  3,364,819
HYDRAULIC GEAR MOTOR Filed July 19, 1965  5 Sheets-Sheet 2

EDWARD L. ACKLEY
INVENTOR

BY
BUCKHORN, BLORE, KLARQUIST & SPARKMAN
ATTORNEYS

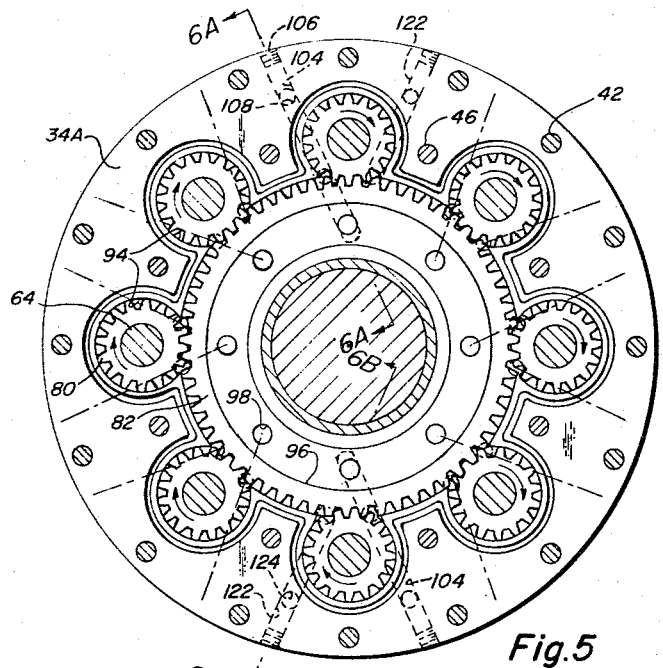
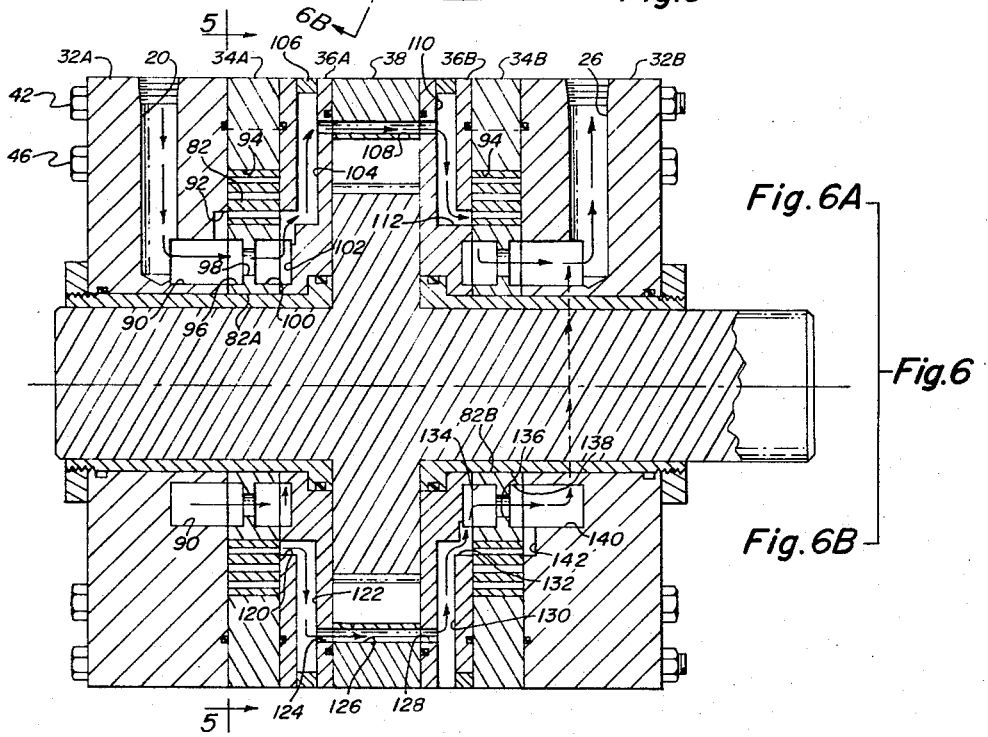

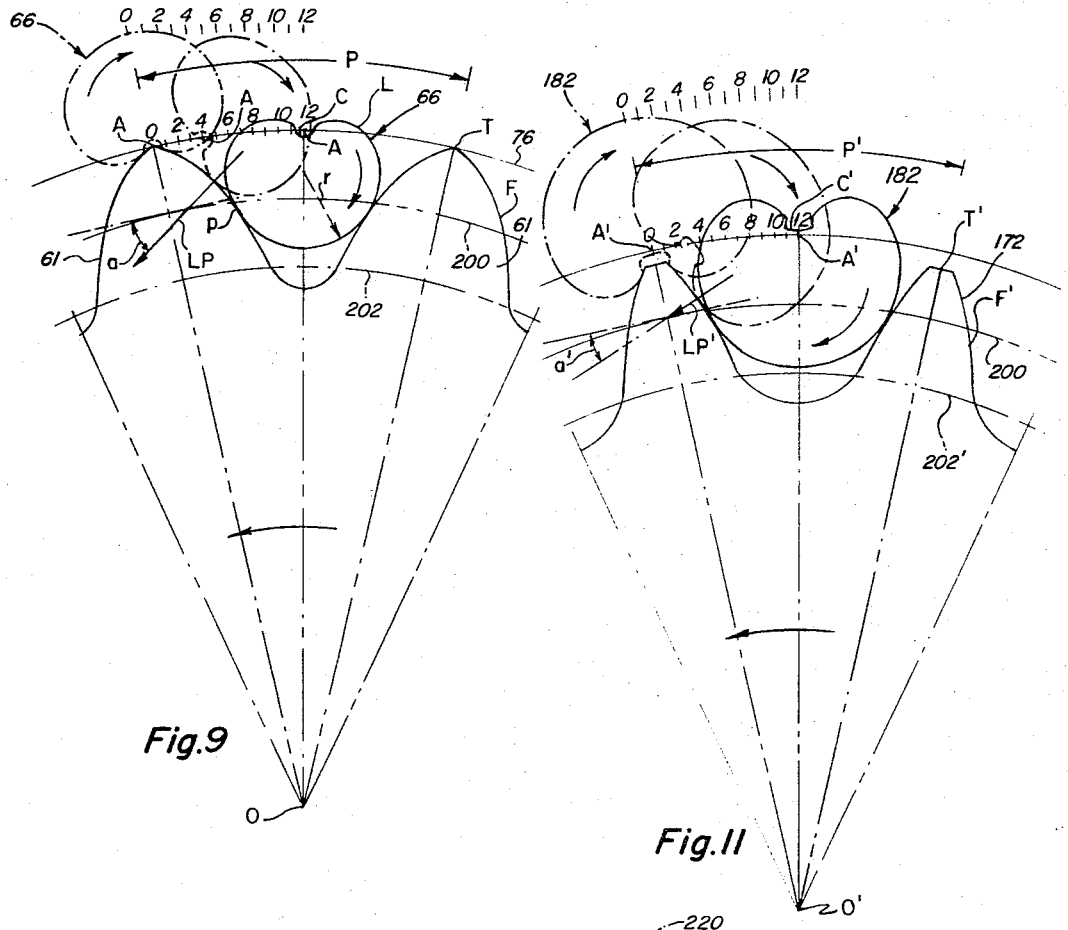
Fig.9
Fig.11
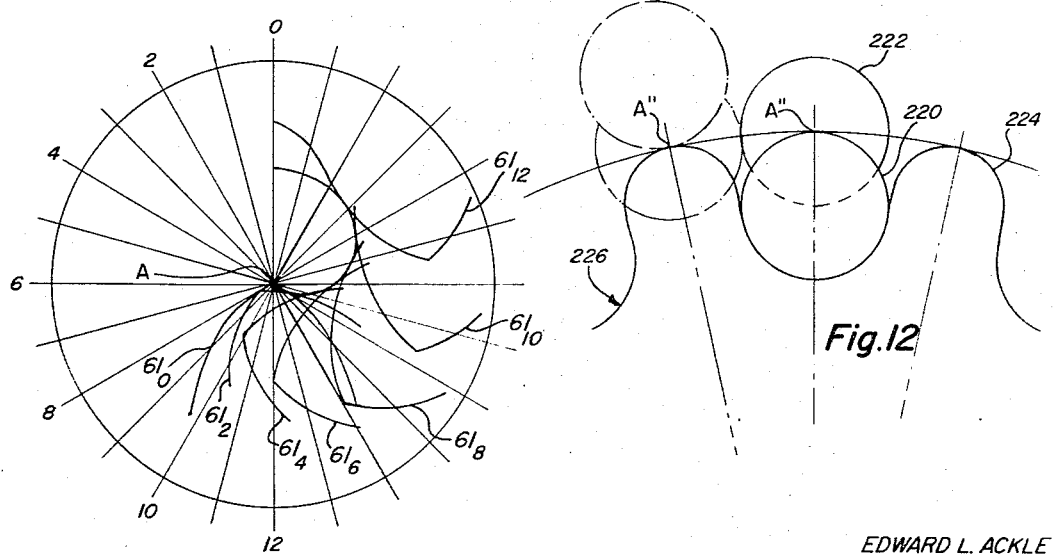
Fig.10
Fig.12

United States Patent Office 3,364,819
Patented Jan. 23, 1968

3,364,819
HYDRAULIC GEAR MOTOR
Edward L. Ackley, 329 SE. 50th Ave.,
Portland, Oreg. 97215
Filed July 19, 1965, Ser. No. 473,047
12 Claims. (Cl. 91—92)

ABSTRACT OF THE DISCLOSURE

The present application discloses a hydraulic gear reduction motor including a cylindrical housing, an axial output shaft rotatably mounted in the housing and an integral multi-toothed primary gear on the shaft intermeshing with a series of pinion gears. The pinion gears each include a rotatively mounted shaft and a single, generally heart-shaped tooth offset from the axis of the shaft such that rotation of the pinion teeth about their shaft axes at a constant speed rotates the primary gear continuously at a substantially constant speed through a distance of one pitch for each revolution of the pinions. Gear motors are keyed to the opposite ends of each pinion shaft, and each gear motor engages a central timing gear rotatably carried on the output shaft. A series of plates form the housing for the hydraulic motor, and passages therethrough define the hydraulic circuit for directing pressurized fluid from an external source to the various gear motors for rotating the pinion shafts.

---

The present invention pertains to gearing, and more particularly to a reduction gear apparatus. An important illustrated application of the invention is in hydraulic gear reduction motors, although the invention is not limited to such applications.

There is a need today for extremely high torque-low speed gear motors of practical, relatively small size and light weight for use in, for example, portable equipment. A distinct disadvantage of present hydraulic and other gear motor types is that their output torque cannot be increased appreciably beyond present levels without also increasing the size of such motors, often to a prohibitive extent for the use intended.

Accordingly, a primary object of the present invention is to provide a new and improved reduction gear apparatus capable of producing a higher output torque for a given input torque than other gear reducers of a comparable size and weight.

Other, more specific, objects of the invention are to provide a new and improved gear reduction apparatus simplified in design, made of a relatively few number of parts, and adaptable to innumerable applications.

Another object is to provide, in a gear reduction apparatus, a pinion having only a single tooth.

Still another important object is to provide a new and improved gear reduction apparatus utilizing a series of single-toothed pinions in combination with a multi-toothed primary gear to produce continuous motion under high torque.

A further object is to provide a new and improved gear reduction apparatus as aforesaid which utilizes a generally heart-shaped, single-toothed pinion to produce motion at a uniform velocity.

Another object is to provide high reduction gearing including a single-toothed pinion having a shape which provides primarily rolling engagement between its surfaces and the mating surfaces of the teeth of a primary gear.

Another primary object of the invention is to provide a new and improved hydraulic gear motor utilizing the foregoing gear reduction apparatus.

Another specific object is to provide a hydraulic gear reduction motor of small size and light weight capable of producing an unusually high output torque for its size and weight.

Another object is to provide hydraulic gear reduction motor as aforesaid which is reversible.

Another object is to provide a hydraulic gear reduction motor producing an unusually high output torque for any given input pressure.

A further object is to provide a hydraulic gear reduction motor incorporating a novel and simplified fluid circuit which facilitates the reversibility and the high torque characteristics of the motor.

Still other objects are to provide a hydraulic gear reduction motor which is low in cost, simplified and versatile in design and easy to maintain.

While the gear reduction apparatus comprising a primary gear and a series of single-toothed pinion gears is described hereinafter in conjunction with a hydraulic gear reduction motor, it is to be understood that such apparatus has numerous applications apart from those illustrated. For example, the apparatus can be used as a simple gear reducer in conjunction with an electric, or other power source.

The above and other objects and advantages will become more apparent from a reading of the following detailed description which proceeds with reference to the accompanying drawings wherein:

FIG. 1 is a somewhat schematic perspective view of a hydraulic gear motor in accordance with the present invention;

FIG. 2 is an exploded perspective view of the motor of FIG. 1 on approximately the same scale as FIG. 1;

FIG. 5 is a view partly in section on the same scale as FIG. 4 taken along the line 5—5 of FIGS. 3 and 6;

FIG. 6 is a composite sectional view on the same scale as FIG. 5 including FIGS. 6A and 6B taken respectively along the lines 6A—6A and 6B—6B of FIG. 5 showing the oil circuit of the hydraulic motor;

FIG. 9 is an enlarged diagrammatic view illustrating the primary tooth form and pinion tooth form for the gear reduction portion of the motor of FIGS. 1 through 6;

FIG. 10 is a diagrammatic view illustrating the construction of a pinion tooth to fit the primary tooth form of FIG. 9;

FIG. 11 is a diagrammatic view, on the same scale as FIG. 9, illustrating the primary tooth form and pinion tooth form of the gear reduction portion of the motor of FIGS. 7 and 8;

FIG. 12 is a diagrammatic view of another primary tooth form and a circular pinion tooth form of gear reduction apparatus; and FIG. 13 is a diagrammatic view on a smaller scale than FIG. 1, illustrating another embodiment of the invention.

DESCRIPTION OF FIG. 1 FORM

Figure 3:
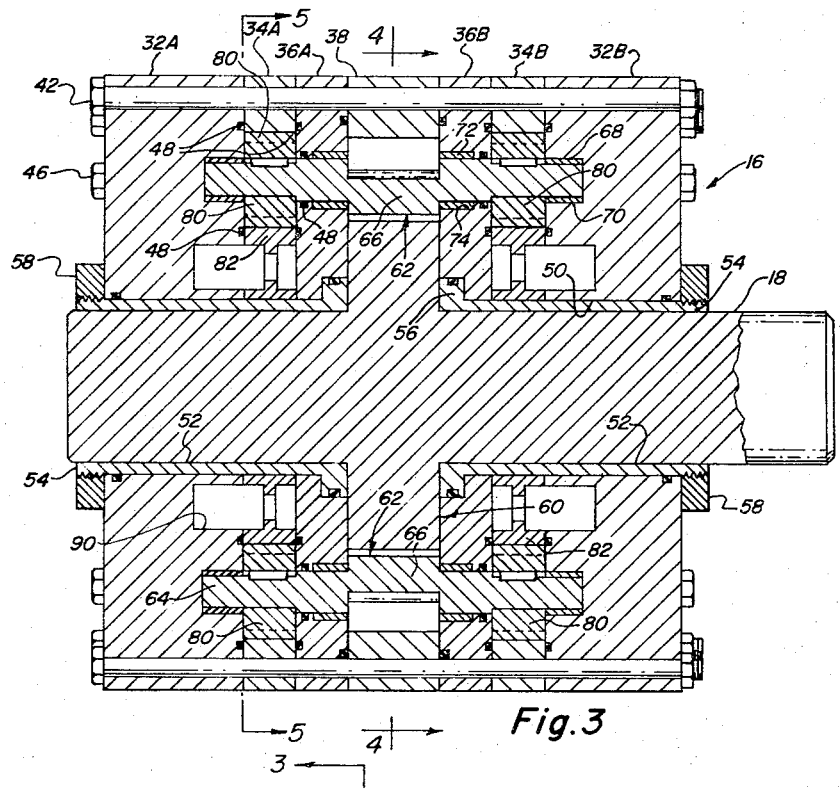
FIG. 3 is a longitudinal sectional view on an enlarged scale taken approximately along the line 3—3 of FIGS. 1 and 4.

With reference to the drawings, FIG. 1 illustrates a hydraulic gear motor indicated generally at 10 stationarily mounted by a bracket 12 on the top surface of a base member 14. The motor includes a cylindrical housing 16 and an output shaft 18 extending centrally through the housing and rotatably mounted within such housing in a manner to be described.

The housing has a fluid inlet 20 at one end thereof connected by a fluid supply line 22 to a source of fluid pressure 24. A fluid exhaust opening 26 at the opposite end of the housing is connected by a fluid return line 28 to a fluid reservoir 30 which supplies fluid to the pump 24.

With reference especially to FIG. 2, the housing is made up of a plurality of cylindrical plates, including a pair of identical opposite end plates 32a and 32b, a pair of gear motor housing plates 34a, 34b, inwardly adjacent the end plates, a pair of spacer plates 36a, 36b inwardly adjacent the gear motor housing plates, and a single center pinion housing plate 38. Each of the foregoing plates is provided with a series of outer circumferential openings 40 which are aligned to receive a series of through bolts 42 (FIG. 1) to retain the plates in tight engagement with one another and maintain their proper alignment with respect to one another. The outermost three plates 32, 34 and 36 at each end of the housing also include an inner series of circumferential openings 44 which are aligned with one another to receive a second series of bolts 46 (FIG. 1) which extend through plates 32, 34 and are threaded into plates 36 from the opposite ends of the housing and which supplement the outer through bolts 42 in holding the housing together. As shown in FIG. 3, there are provided in appropriate grooves in certain of the plates a series of O-ring seals 48 which together with the through bolts provide for fluid-tight sealing engagement of the plates with one another.

Referring especially to FIGS. 2 and 3, the output shaft 18 extends through axially aligned central openings 50 in the housing plates and is journaled in a pair of sleeve bushings 52 which extend axially inwardly from the opposite ends of the housing. The bushings each include an outer threaded end portion 54 which extends outwardly of the outer face of its corresponding end plate 32 and has an inner flanged end 56 terminating at the innermost face of the corresponding spacer plate 36. The threaded outer end 54 of each bushing 52 receives a nut 58 which serves to retain the bushing in the housing. The nut also coacts with the bushing flange 56 to compress together the central portions of the three plates 32, 34 and 36 to augment the through bolts in maintaining a fluid-tight seal between plates.

Mounted centrally within the housing integral with the output shaft 18 is a single primary gear 60 having fourteen teeth 61 of uniform pitch and form. The primary gear fits within the enlarged housing portion defined by the central opening in the center housing plate 38. The flanged ends 56 of the opposed sleeve bushings provide a thrust bearing surface for the primary gear.

Figure 4:
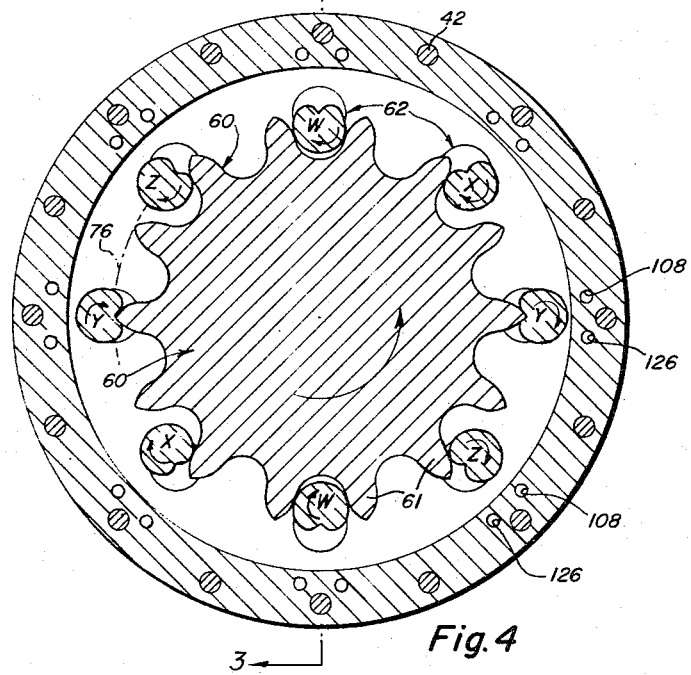
FIG. 4 is a transverse sectional view on the same scale as FIG. 3 taken approximately along the line 4—4 of FIG. 3.

The primary gear is driven by a series of eight, pinion gear members 62, only two of which are shown in full lines in FIG. 2, but all of which are shown in FIG. 4. The pinion gear members 62 are not conventional pinions, but include a shaft portion 64 extending in opposite directions from an eccentric tooth portion 66 offset from the axis of rotation of the shaft portion. The tooth 66, as shown in FIG. 4 and in greater detail in FIG. 9, in transverse section is generally of heart shape with the cusp C, or intersection of the two lobes, of the heart being position adjacent the axis of rotation of the pinion shaft and the opposite portion of the heart extending away from such axis. Each pinion shaft is journaled in a series of bushings including a pair of end bushings 68 within suitable openings 70 in the end bearing plates and bushings 72 in openings 74 through the spacer plates.

The axis of rotation of each pinion shaft lies on or closely adjacent to the outer circle 76 described by the tops T of the primary gear teeth 61 (see FIG. 9) so that as each pinion rotates, the cusp C and adjacent lobe portions L of each pinion tooth engage the top and adjacent flank portions of each primary tooth, the flanks F of each pinion tooth engage the flanks of the primary teeth, and the bottom portion of each pinion tooth opposite the cusps occupies the depths of the groove between adjacent primary teeth.

It will thus be apparent that a rotation of each pinion gear through one full revolution will move the primary gear through a distance of one pitch, so that in effect each pinion gear consistutes a single-toothed pinion effecting in the motor of FIG. 1 a 14 to 1 speed reduction and a corresponding increase in torque in the output shaft. Thus, the primary gear as driven by the series of pinions constitutes an extremely efficient and compact gear reducer capable of converting a high speed and relatively low torque in the pinions to a low speed and high torque in the output shaft.

Now with reference to FIGS. 3 and 5, a conventional gear motor 80 is keyed to each of the opposite ends of each pinion shaft 64. Thus, the hydraulic motor unit has a total of sixteen gear motors, two on each pinion shaft. The gear motors on each side of the primary gear engage one of two timing gears 82, which are rotatably carried on each of the two bushings 52 within the enlarged center opening in the gear motor housing plates 34a and 34b. The timing gears correlate the relative positions of the several pinions 62 with the teeth of the primary gear 60 so that the pinions are synchronized to impart to the primary gear continuous rotation under substantially full torque at all times. Another important function of the timing gears is in transmitting force from the pinions which at any given time are not in driving engagement with the primary gear to the pinions which are in driving engagement at such time. Thus, each pinion tooth will exert a maximum pressure against an engaged primary tooth.

The eight pinions are arranged in diametrically opposed pairs with each of the opposed pairs W through Z, as shown in FIG. 4, being in the same stage of rotation and at the same pressure angle with respect to their mating primary teeth 61 to balance the loading imposed on the output shaft and its bushings 52. At any instant, each pair of pinions engaged is at a different stage of rotation and different pitch position with respect to the primary teeth than every other pair so that at any time at least one pair of pinions is drivingly engaging the primary gear. For example, in FIG. 4 only the pair of pinions X is applying torque, while the pair W has just finished applying torque, the pair Z is rotating into position to apply torque and the pair Y is about to commence applying torque, assuming rotation of the pinions in a clockwise direction.

FLUID CIRCUIT

Path of pressure fluid

The fluid circuit for directing pressurized fluid into the gear motors is shown most clearly in FIG. 6 which is a composite of FIG. 6A showing a pressure fluid circuit for one set of gear motors and FIG. 6B showing an exhaust fluid circuit for another set of gear motors. The fluid circuit is provided by a series of passages through the housing which are formed by various openings through, and passages in, the individual plates which make up the housing when such plates are held together in their intended relationship.

With reference first to FIG. 6A, the pressure fluid portion of the circuit includes the radial inlet opening 20 in end plate 32a, which admits fluid from the external source shown in FIG. 1, such opening communicating with an annular recess 90 in the inner face of the end plate. Extending radially outwardly from the annular recess 90 circumferentially of the end plate are a plurality of short radial slots 92 corresponding with the number of gear motors on one side of the primary gear, each of such radial slots being in registration with a generally circular cavity 94 in gear housing plate 34a within which cavities the gear motors 80 reside. In this manner a portion of the pressure fluid entering the radial end plate opening 20 is directed against the teeth of each one of the gear motors on the same side of the housing as the opening 20.

However, another portion of the fluid entering the end plate 32a is directed into an annular recess 96 in the outer face of timing gear 82 and in registration with the annular recess 90 in end plate 32a and thence through a plurality of through openings 98 in the timing gear. On the opposite face of the timing gear is another annular recess 100 into which the portion of the pressure fluid enters for distribution into an annular recess 102 in the outer face of spacer plate 36a. From the latter recess a portion of the pressure fluid passes generally radially outwardly through an internal passage 104 in spacer plate 36a, which is blocked at its outer end by a plug 106. From this internal passage, the fluid passes through a longitudinal opening 108 in center plate 38 and into another internal passage 110 in spacer plate 36b and then through an opening 112 in the outer face of plate 36b into a gear motor cavity 94 in gear motor housing plate 34b.

This completes the path of the pressure fluid through one set of gear motors for one of the pinions, the paths of the pressure fluid for the other sets of gear motors for the remaining pinions being identical to the foregoing. It will be apparent that the entering pressure fluid is divided between the gear motors on opposite sides of the housing through the provision of bypass passageways which divide the incoming pressure fluid between the gear motors on the opposite sides of the housing.

*Path of exhaust fluid*

After the pressure fluid enters the cavity 94 in plate 34a, it travels around the circumference thereof between the gear motor teeth to drive the same and thus the pinion shaft in a direction of rotation of the gear motors, and then the exhaust fluid exits from the cavity through an opening 120 (FIG. 6B) in spacer plate 36a to commence the exhaust passage portion of the circuit. From the opening 120, fluid passes through an internal passage 122 in plate 36a corresponding to passage 110 in plate 36b, out through an opening 124 in plate 36 and through a longitudinal passage 126 in center plate 38. From there the exhaust fluid passes through an opening 128 in plate 36b into an internal passage 130 corresponding to the internal passage 104 in plate 36a. From the internal passage 130 the exhaust fluid passes through opening 132 in plate 36b and into an annular recess 134, through opening 136, and annular recess 138 in the other timing gear 82b, and thence into an annular recess 140 in the opposite end plate 32b and out radial opening 26.

FIGS. 6A and 6B together illustrate how exhaust fluid passes from the gear motor cavities in plate 34b into the outlet opening 26. After a pressure fluid enters the gear motor cavities 94 in plate 34b through opening 112 as shown in FIG. 6A, the fluid passes with the gears around such cavities and then out into radial slots 142 which correspond to the radial slots 92 in end plate 32a. From slots 142 the exhaust fluid is directed into the annular recess 140 in plate 32b, from which it passes into outlet opening 26.

Exhaust fluid from all of the gear motors passes from the housing through radial opening 26 in end plate 32b and then into the external return line 28 which conveys the exhaust fluid to the reservoir 30 as previously described with respect to FIG. 1.

OPERATION OF FIG. 1 FORM

With the pressure fluid passing through the housing in the direction just described with respect to FIGS. 6A and 6B, the fluid motors, as shown in FIG. 5, will be driven in a clockwise direction so that the pinion teeth as shown in FIG. 4 will also be driven in a clockwise direction as indicated by the arrows in the latter figure. However, by reversing the direction of the pressure fluid through the housing, that is, by injecting pressure fluid into the housing through the opening 26 in the end plate 32b and exhausting fluid through outlet opening 20 in end plate 32a, the direction of the pinions and thus the motor can be reversed, since the fluid circuit as just described in all essential respects is fully reversible. In such a case, the directions of arrows in the passages of FIGS. 6A and 6B would be reversed, and FIG. 6A would disclose primarily the passageway for exhaust fluid through the housing whereas FIG. 6B would disclose primarily the path of pressure fluid through the housing.

DESCRIPTION OF FIG. 7 FORM

Figure 7:
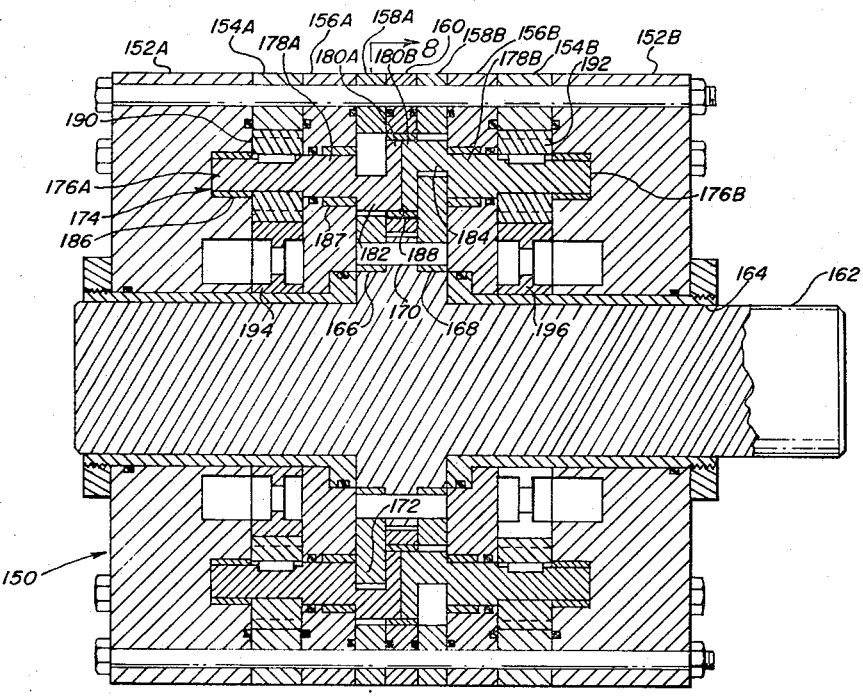
FIG. 7 is a longitudinal sectional view taken approximately along the line 7—7 of FIG. 8 illustrating a modified hydraulic gear motor in accordance with the present invention.
Figure 8:
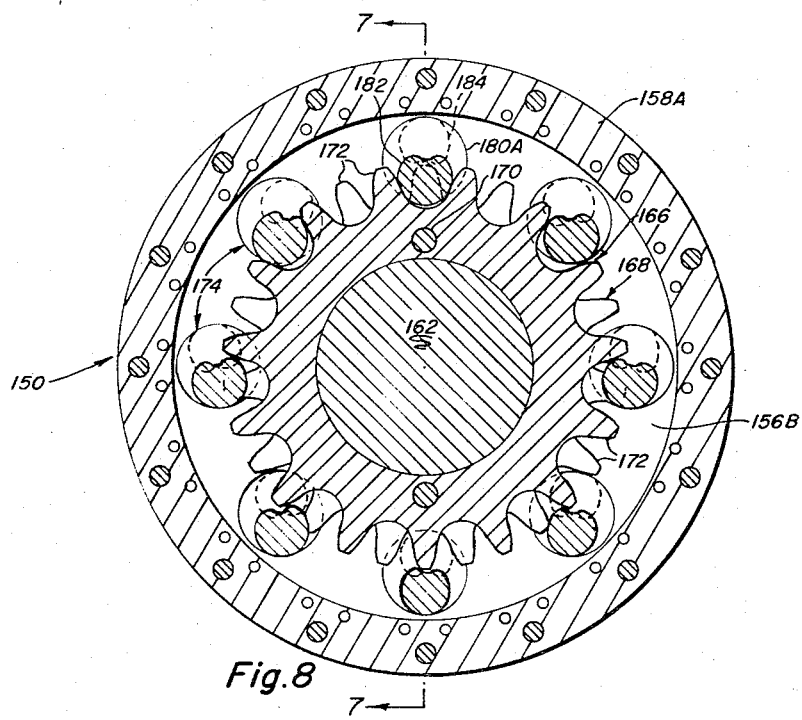
FIG. 8 is a view partly in section taken along the line 8—8 of FIG. 7.

With reference to FIGS. 7 and 8, there is shown a modified form of hydraulic motor embodying the invention. This embodiment differs from the FIG. 1 form primarily in that each pinion shaft carries two, rather than one, single-toothed pinions. The motor includes a housing 150 made up of opposite end plates 152a, 152b, gear motor housing plates 154a, 154b and spacer plates 156a, 156b. In addition, there are three center housing plates instead of the single center plate of the first-described embodiment, such plates including a first pinion housing plate 158a, a second pinion housing plate 158b and a center pinion bearing plate 160.

An output shaft 162 is rotatably mounted in bushings 164 centrally within the housing, such bushings and shaft being substantially the same as the corresponding parts of the previous embodiment. However, the shaft 162 has a pair of axially spaced-apart primary gears 166, 168 keyed at 170 to the output shaft, rather than having a single primary gear integral with the output shaft as in the FIG. 1 embodiment. Each of the two primary gears has fifteen teeth 172, but the gears are mounted so that the teeth on one primary gear are one-half pitch out of phase with respect to the teeth of the other primary gear. The teeth 172 differ from the form of the teeth 61 of the primary gear in the previous embodiment, and are of sprocket-tooth form for a reason described hereinafter.

Intermeshing with each of the two primary gears are eighth pinion gear members 174 rotatably mounted in the housing at equally circumferentially spaced intervals about the primary gears. Each pinion member, as shown in FIG. 8, includes three distinct shaft portions, including end shaft portions 176a, 176b, intermediate shaft portions 178a, 178b of slightly large diameter than the end shaft portions, and center shaft portions 180a, 180b which are larger than the other two shaft portions. Each pinion member also includes two pinion lobes, or teeth, eccentric with respect to the axis of the pinion shaft portions, including a first pinion tooth 182 meshing with the teeth of primary gear 166, and a second pinion tooth 184 meshing with primary gear 168. The two teeth of each pinion member are 180 degrees out of phase with one another on opposite sides of the pinion shaft axis to mesh properly with the two primary gears whose teeth are one-half pitch out of phase.

Each pinion member is split into two equal parts, each containing one of the two pinion teeth so as to facilitate assembly and to prevent any lead or lag between pinion teeth which would otherwise prevent one of such teeth from applying full torque to its corresponding primary gear and result in leakage of hydraulic fluid.

The three shaft portions of each part of a pinion member are mounted in bearings 186, 187, 188 within suitable openings provided in the housing plates through which such shaft portions extend. The center bearing 188 mounts the large central shaft portion of both halves of the pinion member.

Each tooth of each pinion member is of generally heart-shaped configuration as in the previous embodiment, and specifically of a shape to impart a constant rate of rotation to the primary gear it engages, and thus the output shaft. From the foregoing, it will be apparent that each of the pinion members 174 of the FIG. 7 embodiment is, in effect, a single-toothed pinion since each of the two eccentric teeth of each such member engages a different primary gear and rotates its respective primary gear through a distance of one pitch for each revolution of the pinion shaft, effecting in this manner a 15 to 1 speed reduction and corresponding increase in torque in the output shaft.

The opposite end shaft portions 176a, 176b of each pinion member carry conventional gear motors 190, 192, like the corresponding portions of the pinion members in the FIG. 1 embodiment. These gear motors mesh with timing gears 194, 196 rotatably carried on the output shaft bushings 164. The gear motors are driven by hydraulic fluid in the same manner as the gear motors of the FIG. 1 motor previously described with respect to FIGS. 6A and 6B, the only difference being that there are three center plates 158a, 158b and 160 in the FIG. 7 embodiment in place of the single center plate of the FIG. 1 embodiment to define the central passages 108, 126 of the fluid circuit.

The primary advantage of using double primary gears and double pinion members rather than a single primary gear and single pinion members is to provide a greater number of working pinions, resulting in a smoother operating motor with less pulsation and less severe strain imposed on individual pinions and their bearings. With two pinion teeth on each member, rather than one, coacting with two primary gears, rather than one, one-half a pitch out of registration with one another, there are double the number of pinion teeth driving the output shaft, and no lapse between the time when torque is applied successively by different pinions, thus insuring smoother operation than with the FIG. 1 embodiment. Of course, the FIG. 7 form also provides a slightly greater, 15 to 1, reduction than the 14 to 1 reduction of the FIG. 1 form, while still providing a balanced loading of the output shaft and bushings.

Although pinion members having one or two pinion teeth coacting with a corresponding number of primary gears on the output shaft probably represent the most practical embodiments for most purposes, other gear motors could be devised employing three, four or more pinion teeth per member and a corresponding number of primary gears.

SHAPES OF PINION TEETH

Although the sets of single-toothed pinions of FIGS. 4 and 8 are, in both instances, generally heart-shaped, as previously noted, to impart to their respective primary gears a constant angular velocity, the specific shapes of the pinion teeth of such sets differ in accordance with the differences in the tooth forms of their respective primary gears.

The primary gear teeth 61 of FIG. 4 are of what may be termed an involute shape as the flanks F of each such tooth follow a relatively full involute curve and come to a point at the top T of the tooth, giving to each such tooth a relatively great thickness at the pitch circle 200 and at the base circle 202, as shown clearly in the enlarged view of FIG. 9, and thus leaving a small space between teeth. In comparison, the primary teeth 172 of FIG. 8 are generally of sprocket form as shown most clearly in FIG. 11, with flat tops T' and only slightly curved and nearly vertical flanks F', resulting in a comparatively small tooth thickness at the pitch and base circles 200' and 202' and a comparatively large space between adjacent teeth.

For purposes of comparison, the involute gear teeth 61 and the sprocket gear teeth 172 are laid out in FIGS. 9 and 11 with equal circular pitches P and P' and equal diametral pitches although in FIGS. 4 and 8 the primary gears have fourteen and fifteen teeth, respectively. As a result of the above differences in shapes of the primary gear teeth of FIGS. 9 and 11, the pinion tooth 66 of FIG. 9 is considerably smaller than the pinion tooth 182, the cusp C of pinion 66 is pointed whereas the cusp C' of pinion 182 is flat, and the generated peripheral curves of the flanks of the two forms of pinions also differ somewhat.

Although both the pinion 66 and the pinion 182 are constructed to impart to their respective primary gears a uniform rate of speed, each form of gearing has an advantage over the other. The involute primary tooth form of FIG. 9 generates a pinion tooth 66 that rolls over the flanks F of the primary teeth with a minimum of slippage, thereby minimizing wear, whereas the sprocket tooth form of FIG. 11 generates a pinion tooth 182 that slips considerably over the flanks F' of the primary teeth as it rotates from its topmost position at the top of each primary tooth to its bottom position in the groove between adjacent primary teeth.

On the other hand, the sprocket tooth form of FIG. 11 has an advantage over the involute tooth form of FIG. 9 in that the line of pressure LP' of the pinion for the sprocket tooth makes a considerably smaller negative pressure angle $a'$ than the pressure angle $a$ formed by the line of pressure LP of the pinion 66 for the involute tooth when both are exerting their maximum torque effect on their respective primary gear teeth, so the maximum effective leverage applied by the pinions for the sprocket teeth will be greater than that applied by the pinions for the involute gear teeth. In practice, it may be desirable to use a primary tooth form that is a compromise of the shapes in FIGS. 9 and 11 so as to strike a balance between slippage and torque factors.

Construction of pinion to impart constant speed

The generation of the pinion tooth 66 of FIG. 9 by the illustrated involute primary tooth form 61 to impart constant speed to the primary tooth is demonstrated in FIG. 10. First, the circular pitch distance P between adjacent primary teeth is divided into an equal number of parts, in this case 24, or 12 through a distance of one-half pitch, so that each division represents $\frac{1}{24}$ pitch. On a separate piece of tracing paper, the area surrounding a point A, representing the axis about which the pinion tooth 66 rotates, is divided into the same number of parts, 24, into which the pitch distance P is divided, as shown in FIG. 10.

It will be evident that if the pinion tooth is to impart a constant rate of speed to the primary gear teeth, each primary tooth must move through $\frac{1}{24}$ pitch, or 15 degrees, for every $\frac{1}{24}$ of a revolution, or 15 degrees, that the pinion rotates. The axis of rotation A of the pinion must be positioned either on or outside the outer circle 76 described by the tops T of the primary teeth 61 as they rotate about the central axis O of the primary gear if the pinions are to clear the tops of the primary teeth at the topmost positions of the former. Thus, assuming that the primary gear 61 of FIG. 9 is to be rotated in a counterclockwise direction as shown, each pinion 66 must rotate in a clockwise direction. Therefore the axis A of each pinion will have to move relative to the primary teeth along the outer circle 76 from left to right starting at the zero position at the top of a primary tooth to the number twelve position midway between two teeth in rotating through one-half a revolution and at the same time moving through one-half a pitch of the primary gear.

With the above background, the required shape of the pinion is determined as follows: First the point A of the tracing, FIG. 10, is placed on the zero point of outer circle 76 of FIG. 9, and the zero line of FIG. 10 is made to coincide with the zero line of FIG. 9. With the tracing of FIG. 10 thus laid over FIG. 9, the profile of the primary tooth is traced on FIG. 10, as represented by tooth tracing $61_0$. Then the point A of FIG. 10 is moved to position No. 2 on outer circle 76 of FIG. 9, line 2 of FIG. 10 is made to coincide with line 2 of FIG. 9, and tooth 61 is again traced on FIG. 10, resulting in a second tooth tracing $61_2$. The preceding steps are repeated, placing the point A of FIG. 10 successively on points 4, 6, 8, 10 and 12 of FIG. 9 and at the same time making lines 4, 6, 8, 10 and 12 of FIG. 10 successively coincide with the corresponding lines of FIG. 9, and tracing each time the profile of tooth 61, resulting in tooth tracings $61_4$, $61_6$, $61_8$, $61_{10}$ and $61_{12}$ on FIG. 10. When this is completed, the tracings of tooth profile 61 will define one-half a heart, which represents the shape and size of one-half of the pinion tooth 66 necessary to impart a uniform rate of speed to the tooth 61. The profiles $61_0$–$61_{12}$ can then be connected by a smooth curve drawn tangent to each profile to define the final shape of one-half the pinion. The other half will, of course, be identical in shape and therefore need not be constructed. At the one-half pitch point midway between two primary teeth 61, the bottom of the pinion tooth 66 need not fill the groove to the root of the primary gear teeth since the bottom portion of the pinion does not work. It is therefore desirable for purposes of economy and simplicity of manufacture that the bottom portion of the pinion, below the pressure point $p$ at the one-half pitch position between primary teeth, be rounded off to describe a curve having a constant radius $r$ as shown in FIG. 9.

In practice, the shape of a pinion tooth for a given form of primary tooth would be more accurately determined by first enlarging the primary tooth layout of FIG. 9 many times by means of a comparator and by then plotting many more positions of the primary tooth profile than was done on FIG. 10.

The exact shape of pinion tooth 182 required for the sprocket gear of FIG. 11 would be determined in the same manner as described for the pinion 66 with reference to FIGS. 9 and 10. In fact, the required size and shape of pinions for any given primary tooth form can be determined in the foregoing manner.

If a reduction gear train as described were irreversible, it would be unnecessary, except possibly for strength, to provide a full heart-shaped pinion since only one of the two flanks of a heart-shaped pinion would ever be exerting driving pressure on the primary gear teeth. Thus, only one-half a heart would suffice. However, in most instances a full heart-shape is preferable for strength, to provide for reversibility of the gear train, and for ease of manufacture.

FIG. 12 illustrates diagrammatically a circular single-toothed pinion 220 mounted eccentrically on a pinion shaft 222 and rotatable about the axis A″ of such shaft to intermesh with rounded teeth 224 of a primary gear 226. The circular single-toothed pinion is impractical for most purposes because it imparts a non-uniform rate of movement to the primary teeth 224. The characteristic speed curve produced by this pinion rotating at a constant speed, if plotted for movement of the primary teeth through one pitch, would follow a sine wave, with the speed of the primary gear being a minimum when the pinion is at its topmost position at the top of each primary tooth and at a maximum when the pinion is at the one-half pitch point midway between two primary teeth, as shown by the two positions of the pinion in FIG. 12. Thus, with a circular pinion tooth, a definite pulsating motion would be imparted to the output shaft unless a sufficiently large number of such pinions were utilized to make the pulsating motion substantially imperceptible. However, the use of plural pinions having circular teeth would result in timing problems, since an ordinary spur timing gear as used hereinbefore could not be used to synchronize the relative positions of the pinions about the primary gear. A belt timing means, or some other means of maintaining the pinions in synchronization, would have to be employed. For the foregoing reasons, the circular pinion tooth form is not preferred and would, for most gear reduction applications, have little practical value, at least where a constant output speed is desired.

FIG. 13 FORM

FIG. 13 illustrates schematically a nonhydraulic application of the high-reduction gear train incorporating a series of single-tooth pinions as disclosed hereinbefore. In this application, the prime mover is an electric motor 230 having a drive shaft 232 with a conventional spur gear 234 fixed to the outer end of the shaft. The spur gear intermeshes with a plurality of pinion gears 236 fixed to one end of pinion shafts 238, each of which incorporates an eccentric, single-toothed pinion 240. The pinions 240 are of generally heart-shaped configuration and designed to impart to the teeth of a primary gear 242, and thus to a connected output shaft 244, continuous rotation at a constant speed. The teeth of the primary gear could be, for example, one of the forms previously discussed, or any other form desired. The entire compact assembly may be incorporated in a unitary housing 246 having a base support 248.

From the foregoing it will be apparent that the spur gear 234 would transmit input torque from the drive shaft 232 to the pinions, and at the same time would serve as a timing gear to synchronize the application of pressure to the primary gear by each of the pinions.

OTHER POSSIBLE APPLICATIONS

Numerous applications for the single-toothed pinion in combination with a primary gear or rack other than those illustrated will occur to persons of ordinary skill in the art. For example, in a fluid motor application, pressure fluid could be admitted into the pinion chambers to drive directly the single-toothed pinions, rather than directing the fluid against the conventional pinion gear motors at the ends of the pinion shafts, as illustrated. This would require, however, a somewhat more complex fluid circuit including provision for timing the injection of fluid into each pinion chamber. Leakage of fluid could also be expected to be more of a problem in the last mentioned variation than in the illustrated fluid motor applications, and special sealing means between the pinion teeth and the walls of the chamber would have to be provided.

Another possibility would be to provide a hydraulic motor along the lines of those of FIGS. 1 and 7 with a stationary central shaft so that the pinions would travel around the periphery of the primary gear and the casing would rotate on the shaft. The fluid circuit in such an embodiment would be provided in the shaft rather than in the casing. Such an application would have utility, for example, as a head pulley of a conveyor system, or as a winch drum, in which case the central shaft would project from both ends of the casing and serve as the axle about which the casing rotates.

In all applications in which a continuous motion is desired it is important that a minimum of at least two single-toothed pinions be provided, either on a single pinion shaft in conjunction with at least two different primary gears, or on separate shafts in conjunction with one or more primary gears.

In all applications in which the output shaft is to have a continuous motion at a constant rate of speed, the single pinion teeth will be of generally heart-shaped configuration, at least on the pressure flank of the tooth, with the specific tooth shaped being dependent on the form of its mating primary gear teeth and being generated therefrom.

All of the foregoing suggested embodiments of a reduction gear train incorporating single-toothed pinions have utility in any application requiring a slow speed and an exceptionally high torque, and have particular utility where the reduction gear apparatus must be embodied in an unusually small, light-weight unit.

To illustrate the high theoretical torque which a unit as aforesaid is capable of producing, a small hydraulic gear-reduction motor in accordance with the embodiment of FIG. 1–6, which has been successfully operated, will be used as an example. This unit has a diameter of ten inches and an overall length of about ten inches. It has eight pinion shafts each containing one single-toothed pinion and two conventional gear motors at the opposite ends of a shaft, or a total of sixteen gear motors. The working area of each tooth of each gear motor is 0.166 square inch, and the pitch line radius of each gear motor is 0.612 inch. The primary gear has fourteen teeth to give a 14 to 1 reduction. Assuming arbitrarily a fluid pressure of 1000 p.s.i. acting on each planetary gear motor, the hydraulic motor would produce a theoretical torque in the output shaft as follows:

Let $GM$ = Total number of gear motors;
$A$ = Working area (square inches) of each tooth of each gear motor;
$r$ = Pitch line radius of each gear motor;
$P$ = Total pressure in p.s.i. acting against each gear motor;
$R$ = Effective gear ratio between pinions and primary gear;
$T$ = Theoretical output torque (inch-pounds);

Then $T = GM \cdot A \cdot r \cdot P \cdot R$
$T = 16 \times .166 \times .612 \times 1000 \times 14$
$T = 22,757$ in. lbs.

The above theoretical output torque should be compared with that achieved by a more conventional hydraulic gear reduction motor in which fluid acts against conventional multi-toothed pinions, which in turn mesh directly with a primary gear having approximately four times as many teeth as the pinion gears. Such a motor would have approximately the same diameter as the above-mentioned motor, but would be capable of achieving only a 4 to 1 reduction. Assuming an input pressure of 1000 p.s.i., the prior art motor would develop a theoretical torque of only 4000 inch-pounds as compared to 22,757 inch-pounds for the motor of the present invention.

Having illustrated and described several preferred embodiments of the invention, it should be apparent to those skilled in the art that the invention permits of modification in arrangement and detail. I claim as my invention all such modifications as come within the true spirit and scope of the appended claims.

I claim:

1. A hydraulic motor comprising:
   an output power means,
   primary gear means operatively connected to said output power means, said primary gear means including a series of primary gear teeth of uniform pitch and form,
   a plurality of pinion gear members operatively interengaged with said primary gear means,
   each said pinion gear member including a rotatively mounted shaft and in any cross section normal to the axis of said shaft a single tooth eccentrically mounted with respect to the axis of said shaft and intermeshed with said primary teeth,
   gear motor means fixedly mounted on each said shaft,
   and means defining a series of fluid passages in communication with said gear motors such that pressurized fluid introduced into said passages will effect rotation of said pinion shafts,
   said single teeth being so arranged relative to each other that rotation of said shafts effects a continuous relative movement between said primary gear means and said pinion gear members at a ratio of one pitch on said primary gear means for each revolution of said pinion gear members.

2. A hydraulic motor according to claim 1 wherein said single teeth are generally of heart shape with the cusp of the heart adjacent the axis of rotation of said shaft and with the curvature of the periphery of said heart being correlated with the form of said primary teeth such that rotation of said pinion gear members at a constant speed results in relative movement between said primary gear means and said pinion gear members at a substantially constant speed.

3. A hydraulic motor comprising:
   rotatable means for transmitting an output torque,
   primary gear means having a plurality of gear teeth and being operatively connected to said rotatable means for transmitting an output torque thereto,
   and pinion means including a plurality of single toothed pinions interengaging the teeth of said primary gear means for effecting a continuous rotation of said primary gear means through a distance of one pitch for each revolution of said pinions,
   and means including pressurized fluid and pressure fluid passage means for directing said pressure fluid against said pinion means for rotating said single toothed pinions.

4. A hydraulic gear reduction motor comprising:
   a series of plates defining a housing for said motor,
   said plates being provided with aligned through openings for receiving bolts for clamping said plates together,
   a primary shaft mounted centrally within said housing for relative rotation between said housing and said shaft,
   a primary gear rigidly affixed to said output shaft between the opposite ends of said housing,
   a series of pinion members spaced about said primary gear,
   each of said pinion members including a shaft portion rotatably mounted within said housing and in any cross section normal to the axis of said shaft a single eccentric tooth portion drivingly engaging the teeth of said primary gear,
   the eccentric tooth portions of said pinion members being arranged at different relative positions with respect to the teeth of said primary gear such that continuous rotation of said pinion members about their respective axes effects a continuous rotation of said primary gear and pinion members relative to each other and imposes a balanced load on said primary shaft,
   and means for rotating said pinion shafts including vane means on said pinion shafts and fluid passage means for directing pressure fluid against said vane means.

5. A hydraulic gear motor according to claim 4 wherein each of said eccentric tooth portions is of generally heart shape and has a peripheral curvature interrelated to the shape of the teeth on said primary gear such that rotation of said eccentric tooth portions imparts to said primary gear a continuous rotation at a substantially uniform rate of speed.

6. A hydraulic gear motor according to claim 4 including bushing means rotatably mounting said primary shaft relative to said housing,
   said bushing means including a pair of bushings, one extending inwardly from each of the opposite ends of said housing,
   each said bushing including a flanged inner end providing a thrust bearing surface for said primary gear and a threaded outer end projecting outwardly of an end of said housing for receiving a threaded nut member,
   said nut member and said flanged inner end coacting to compress together those of said housing plates arranged therebetween.

7. A hydraulic gear motor according to claim 4 wherein said vane means includes a multi-toothed pinion gear fixed to each said pinion shaft,
   and wherein said motor includes a central timing gear rotatably carried by said shaft and interengaging said pinion gears for maintaining said eccentric tooth portions in synchronization and for transmitting forces between different eccentric tooth portions.

8. A hydraulic gear motor according to claim 7 wherein each pinion shaft includes two said pinion gears and wherein there are two said timing gears, each interengaging a different one of said pinion gears on the same pinion shaft.

9. A hydraulic gear motor according to claim 8 wherein said housing plates define when assembled together a series of parallel fluid circuits one for each pair of said pinion gears on the same pinion shaft, said parallel circuits having a common inlet and a common outlet through said housing plates, each said circuit including a first branch passage for directing pressure fluid against one of said pair of pinion gears and a second branch passage for directing fluid against the other pinion gear of said pair.

10. A hydraulic gear motor according to claim 9 wherein the direction of flow of pressure fluid through said circuits is reversible and wherein the reversal of flow will reverse the direction of relative rotation between said primary shaft and said housing.

11. A hydraulic gear motor according to claim 4 wherein each said pinion shaft includes two eccentric tooth portions 180 degrees out of phase with respect to each other, and wherein said primary shaft includes two primary gears, each operatively engaging a different one of the two eccentric tooth portions on the same said pinion shaft, said primary gears being one-half pitch out of phase relative to one another.

12. A hydraulic gear motor according to claim 11 wherein each said pinion shaft is split transversely into two parts, each part containing one of said two eccentric tooth portions.

References Cited

UNITED STATES PATENTS

| 1,074,362 | 9/1913 | Holst | 74—436 |
| 1,260,243 | 3/1918 | Moore | 74—804 |
| 1,272,297 | 7/1918 | Motsinger | 91—92 |
| 1,543,791 | 6/1925 | Pitter | 74—804 X |
| 1,967,505 | 7/1934 | Hansen | 74—462 |
| 2,031,888 | 2/1936 | Hill | 74—462 |
| 2,421,463 | 6/1947 | Noreyko | 74—462 |
| 2,666,336 | 1/1954 | Hill et al. | 74—462 |
| 2,934,044 | 4/1960 | Gilreath | 91—92 |
| 3,123,012 | 3/1964 | Gilreath | 91—92 X |
| 3,160,032 | 12/1964 | Black | 74—804 |

FOREIGN PATENTS

| 1,176,950 | 8/1964 | Germany. |

ROBERT A. O'LEARY, *Primary Examiner.*

THOMAS C. PERRY, *Examiner.*